(12) United States Patent
Yue et al.

(10) Patent No.: US 11,708,183 B2
(45) Date of Patent: Jul. 25, 2023

(54) GROUND TEST SYSTEM AND TEST METHOD FOR SPACE-ORIENTED MULTI-ARM SPACECRAFT SYSTEM

(71) Applicant: HARBIN INSTITUTE OF TECHNOLOGY, SHENZHEN, Shenzhen (CN)

(72) Inventors: Chengfei Yue, Shenzhen (CN); Cheng Wei, Shenzhen (CN); Xibin Cao, Shenzhen (CN); Xueqin Chen, Shenzhen (CN); Shi Qiu, Shenzhen (CN); Tao Lin, Shenzhen (CN)

(73) Assignee: HARBIN INSTITUTE OF TECHNOLOGY, SHENZHEN, Shenzhen (CN)

( * ) Notice: Subject to any disclaimer, the term of this patent is extended or adjusted under 35 U.S.C. 154(b) by 0 days.

(21) Appl. No.: 18/061,844

(22) Filed: Dec. 5, 2022

(65) Prior Publication Data
US 2023/0182931 A1     Jun. 15, 2023

(30) Foreign Application Priority Data
Dec. 14, 2021 (CN) .......................... 202111525414.0

(51) Int. Cl.
    *B64G 7/00*      (2006.01)
    *G01M 17/00*      (2006.01)

(52) U.S. Cl.
     CPC ............... *B64G 7/00* (2013.01); *G01M 17/00* (2013.01)

(58) Field of Classification Search
     CPC .................................. G01M 17/00; B64G 7/00
See application file for complete search history.

(56) References Cited

U.S. PATENT DOCUMENTS 3,161,968 A * 12/1964 De Boy .................... B64G 7/00
                                                                       180/125
3,281,964 A * 11/1966 Hewes ...................... G09B 9/02
                                                                        434/34
(Continued)

FOREIGN PATENT DOCUMENTS

CN        101503116 A      8/2009
CN        101698299 A      4/2010
(Continued)

OTHER PUBLICATIONS

First Office Action issued in counterpart Chinese Patent Application No. 202111525414.2, dated Jun. 8, 2022.
(Continued)

*Primary Examiner* — Eric S. McCall
*Assistant Examiner* — Timothy P Graves
(74) *Attorney, Agent, or Firm* — Westbridge IP LLC

(57) ABSTRACT

Disclosed are a ground test system and a test method for a space-oriented multi-arm spacecraft system. A spacecraft system simulator floats on an air-floating platform through four porous air feet, a test truss is placed around the air-floating platform, a simulation auxiliary docking device, a simulation crawling truss and a satellite model are arranged in a middle of a ceiling of the test truss, and an assembly test area and a silent air compressor are arranged on sides of the test truss. The application is used to solve the problems that the prior art cannot simulate the movement and crawling of the multi-arm spacecraft system in space, assembly of large space structures, and the prior art cannot simulate the influence of assembling, catching and other actions on a base in a weightless environment.

9 Claims, 5 Drawing Sheets

(56) References Cited

U.S. PATENT DOCUMENTS

| | | | | |
|---|---|---|---|---|
| 4,860,600 A | * | 8/1989 | Schumacher | B64G 7/00 73/865.6 |
| 5,407,152 A | | 4/1995 | Pelischek et al. | |
| 6,031,486 A | * | 2/2000 | Anderson | B64G 7/00 342/174 |

FOREIGN PATENT DOCUMENTS

| | | | | | |
|---|---|---|---|---|---|
| CN | 102650563 A | * | 8/2012 | | |
| CN | 102650563 A | | 8/2012 | | |
| CN | 103970032 A | | 8/2014 | | |
| CN | 103979121 A | | 8/2014 | | |
| CN | 104175331 A | | 12/2014 | | |
| CN | 104787363 A | * | 7/2015 | | |
| CN | 104787363 A | | 7/2015 | | |
| CN | 108408089 A | * | 8/2018 | | B64G 7/00 |
| CN | 108408089 A | | 8/2018 | | |

OTHER PUBLICATIONS

Second Office Action issued in counterpart Chinese Patent Application No. 202111525414.2, dated Jul. 15, 2022.

\* cited by examiner

GROUND TEST SYSTEM AND TEST METHOD FOR SPACE-ORIENTED MULTI-ARM SPACECRAFT SYSTEM

CROSS-REFERENCE TO RELATED APPLICATIONS

This application claims priority to Chinese Patent Application No. 202111525414.2, filed on Dec. 14, 2021, the contents of which are hereby incorporated by reference.

TECHNICAL FIELD

The application belongs to the technical field of space technology, and particularly relates to a ground test system and a test method for a space-oriented multi-arm spacecraft system.

BACKGROUND

With the deepening and development of space technology research, more and more spacecrafts enter the space. The spacecraft system has developed from a spacecraft with single function and simple structure to a spacecraft system with multiple functions and complex structure. However, about 10% of these spacecrafts have failed at the early stage of launch or orbit, which not only wastes orbit resources, but also threatens the safety of other spacecrafts. Moreover, most spacecrafts are not designed with a function of on-orbit upgrade, and once the spacecrafts fail, the spacecrafts will cause huge losses. Therefore, in order to recover the losses caused by satellite malfunction or failure as much as possible and protect the orbital resources, on-orbit servicing has become the most effective solution to the above problems. Countries are studying complex on-orbit control technologies for purposes of satellite maintenance, fuel filling, satellite life extension, module replacement, orbit cleaning and on-orbit assembly.

On-orbit control technology is complex, difficult to realize, and the on-orbit test is costly and takes a long period. Therefore, when researches are conducted, it is necessary to conduct tests thoroughly with the help of ground simulation devices to verify the algorithms of the planning and control of the on-orbit control of spacecraft system. Only after the feasibility is verified may the launch and the space on-orbit tests be carried out. Because of the particularity of the space environment, it is necessary to simulate the weightlessness environment in space on the ground, which increases the complexity of the test device. The ground test device needs to simulate the weightlessness environment in space. At present, the mature schemes adopt fall-free and gravity-counteracting to simulate, including free-fall method, air flotation method, suspension method, liquid flotation method, etc. A wide range of research has been conducted at home and abroad. The free-fall way mainly refers to drop tower test and airplane parabolic flight test, etc. The gravity-counteracting scheme mainly adopts air flotation including plane air flotation, air bearing and others, liquid flotation of underwater test system, and suspension spring counterweight with first and second suspension. Among many test schemes, the corresponding test schemes should be selected according to the characteristics of simulated objects.

SUMMARY

The application provides a ground test system for a space-oriented multi-arm spacecraft system so as to solve the problems that the prior art cannot simulate the movement and crawling of the multi-arm spacecraft system in space, assemble large-scale space structures, and the prior art cannot simulate influences of assembling, catching and other actions on a base in a weightless environment.

The application provides the ground test system for a space-oriented multi-arm spacecraft system, so as to complete tests of on-orbit assembly, fuel filling, crawling of truss structure, target identification, grabbing and auxiliary docking.

The application also provides a ground test method for a space-oriented multi-arm spacecraft system, so as to position a simulator, capture a motion of the simulator and assist in the planning and control of the simulator.

The application is realized by the following technical scheme.

The ground test system for a space-oriented multi-arm spacecraft system includes an air-floating platform, a spacecraft system simulator, a test truss, a simulation auxiliary docking device, a simulation crawling truss, a satellite model and an assembly test area, where the air-floating platform is placed on a plurality of supporting columns, the spacecraft system simulator floats on the air-floating platform through four porous air feet, the test truss is placed around the air-floating platform, the simulation auxiliary docking device, the simulation crawling truss and the satellite model are arranged in a middle of a ceiling of the test truss, and the assembly test area and a silent air compressor are arranged on sides of the test truss.

In the ground test system for space-oriented multi-arm spacecraft system, the spacecraft system simulator includes a central box, mechanical arms, the porous air feet, actuators and six-dimensional force sensors. A bottom of the spacecraft system simulator is provided with the four porous air feet, the four porous air feet are fixed on a bottom of the central box. Four mechanical arms are installed on sides of the central box, and a tail end of each mechanical arm is provided with one actuator and one six-dimensional force sensor respectively.

In the ground test system for a space-oriented multi-arm spacecraft system, a controller and a power supply are installed in the central box of the spacecraft system simulator, and end cameras are installed at tail ends of the mechanical arms.

In the ground test system for a space-oriented multi-arm spacecraft system, an array of a plurality of vision cameras are uniformly distributed on the ceiling of the test truss, and the array of vision cameras are used for motion capture.

In the ground test system for a space-oriented multi-arm spacecraft system, the air floating platform is used for simulating space microgravity environment and counteracting vertical gravity;

the spacecraft system simulator is used to simulate movement and crawling of the multi-arm spacecraft system in space, an assembly of large-scale space structures, and influences of the assembly and catching actions on the base, and to verify a planning algorithm or a control algorithm of a spacecraft system on-orbit control;

the ceiling of the test truss is used for installing a honeycomb structure simulating the movement, crawling and installation of a spacecraft, suspending a space target for auxiliary docking, and fixing a satellite model target in on-orbit operation, and the array of vision cameras installed around the ceiling of the test truss is used for motion capture, and the sides of the test truss are used for fixing space structures simulating on-orbit assembly;

the simulation auxiliary docking device is used to simulate a docking process of the multi-arm spacecraft system assisting the space target;

the simulation crawling truss is used to simulate a process where the multi-arm spacecraft system moves, crawls and is assembled on the simulation crawling truss;

the satellite model is used for simulating an on-orbit operation processes such as satellite maintenance, fuel filling, module replacement, solar panel auxiliary deployment, etc.;

the assembly test area is used for simulating an on-orbit assembly process of the space structures;

the central box is used for fixing a plurality of mechanical arms of the multi-arm spacecraft system and air feet at the bottom of the central box;

the mechanical arms are used for realizing on-orbit operation actions of the spacecraft system and verifying the planning algorithm and the control algorithm of the on-orbit operation actions of the spacecraft system;

the porous air feet are used for counteracting gravity;

the actuators are used for performing specific operation tasks;

the six-dimensional force sensors are used for measuring forces and moments of the mechanical arms in an operation process;

the supporting columns are used for supporting a marble air-floating platform and adjusting a level of the air-floating platform.

The ground test system for a space-oriented multi-arm spacecraft system includes a central control system, an industrial computer, an on-orbit control simulation target, an air supply system, the silent air compressor, a motion capture system, a vision processing system, the end cameras, the controller and the power supply. The central control system is connected with the motion capture system and the industrial computer respectively, the industrial computer is connected with the controller in the spacecraft system simulator, and the spacecraft system simulator is connected with the on-orbit control simulation target, the air supply system and the silent air compressor respectively.

The controller is used to control the central box, the mechanical arms, the porous air feet, the actuators, the six-dimensional force sensors, the end cameras, the controller and the power supply.

The on-orbit control simulation target is used for controlling the air-floating platform, the test truss, the simulation auxiliary docking device, the simulation crawling truss, the satellite model and the assembly test area.

The motion capture system includes the vision processing system and the array of vision cameras, where the vision processing system is used to process information collected by the array of vision cameras and solve real-time position information and a motion state of the spacecraft system.

In the ground test system for a space-oriented multi-arm spacecraft system, the central control system communicates with the controller through the industrial computer, the central control system send instructions to the controller to control mechanical arms to move according to the instructions through the industrial computer, and joint module encoders, the end cameras and the six-dimensional force sensors on the mechanical arms return position, speed and torque information of each joint module of the mechanical arms and six-dimensional force and position information on tail ends to the central control system through the industrial computer.

The array of vision cameras feeds back motion information of the spacecraft system simulator to the central control system through the vision processing system.

The central control system integrate the information returned by the spacecraft system simulator and the motion information from the motion capture system to control kinematics and dynamics of the spacecraft system simulator.

In the ground test system for a space-oriented multi-arm spacecraft system, the controller is used for controlling the spacecraft system simulator.

The power supply is used for supplying power to the spacecraft system simulator.

The end cameras are used for target identification.

The vision processing system is used to process the information of the array of vision cameras and solve position information and a motion state of the spacecraft system simulator.

The motion capture system is used to capture a position and the motion state of the spacecraft system simulator.

The silent air compressor is used for providing an air source with a preset air pressure.

The air supply system is used for distributing air paths and supplying air to the air feet.

The on-orbit control simulation target is used for a simulation of on-orbit control.

The industrial control computer is used for establishing a communication interface between a central control unit and the spacecraft system simulator and an ethercat (abbreviation of ethernet for control automation technology) master station equipped with a Linux real-time operating system and ethercat master station programs.

The central control system is integrated with a task planning program, motion planning algorithm, kinematics and dynamics solving algorithm for the spacecraft system simulator, control algorithm for mechanical arms, etc., completes the motion planning according to task requirements, comprehensively processes the information of sensors and the motion capture system, gives output signals of the spacecraft system simulator by combining kinematics and dynamics solving, and controls the spacecraft simulator to perform corresponding actions.

A ground test method for a space-oriented multi-arm spacecraft system is provided and the ground test method is specifically:

starting the silent air compressor to make an air pressure of an air tank reach. Mpa, and introducing high-pressure air into the porous air feet through the air paths of the air supply system, so that the spacecraft system simulator may float freely on a marble plane of the air floating platform;

capturing the motion information of the spacecraft system simulator on the air floating platform in real time and feeding back to the central control system in real time by a vision capture system of the array of vision cameras;

obtaining the motion planning for the spacecraft system simulator and the mechanical arms according to the task planning program by the central control system, obtaining corresponding kinematics and dynamics parameters through kinematics and dynamics solving, and sending control instructions to the spacecraft system simulator through the industrial computer to realize the kinematics and dynamics control of the spacecraft system simulator; and grabbing a truss structure in the middle of the ceiling of the truss, according to tasks to be performed, by the mechanical arms and the actuators of the spacecraft system simulator, and controlling the spacecraft system simulator to move freely on the air-floating platform, and move to corresponding areas to perform corresponding tasks.

In the ground test method for a space-oriented multi-arm spacecraft system, different tasks are specifically performed as follows:

when a crawling task is performed, the crawling task is completed in an area of the simulation crawling truss in the middle of the ceiling of the test truss, and a moving task of the spacecraft on surfaces of large space structures is simulated;

when a simulation space auxiliary docking task is performed, the spacecraft system simulator crawls to an area of the simulation auxiliary docking device to realize the auxiliary docking of two spacecrafts through target identification and grabbing;

when a satellite maintenance task is performed, the spacecraft system simulator crawls to an area of satellite model to realize a simulation of satellite maintenance task, such as module replacement and fuel filling of the satellite model;

when a space assembly task is performed, the spacecraft system simulator moves to the assembly test area by crawling to realize an independent assembly of the space structures in the assembly test area, including identifying and grabbing parts, identifying and aligning mounting holes, and clamping and fastening screws, where two mechanical arms of the spacecraft system simulator fix positions and postures, and the other two mechanical arms cooperative control.

The application has following advantages.

The application adopts multi-arm cooperative operation to complete more complicated and delicate operation.

The application increases the working space and simulates a relative movement with the target.

The application simulates the movement and crawling of the multi-arm spacecraft system in space and the assembly of the large space structures.

The application simulates the influence of assembling, catching and other actions on the base in the weightless environment.

DETAILED DESCRIPTION OF THE EMBODIMENTS

Figure 1:
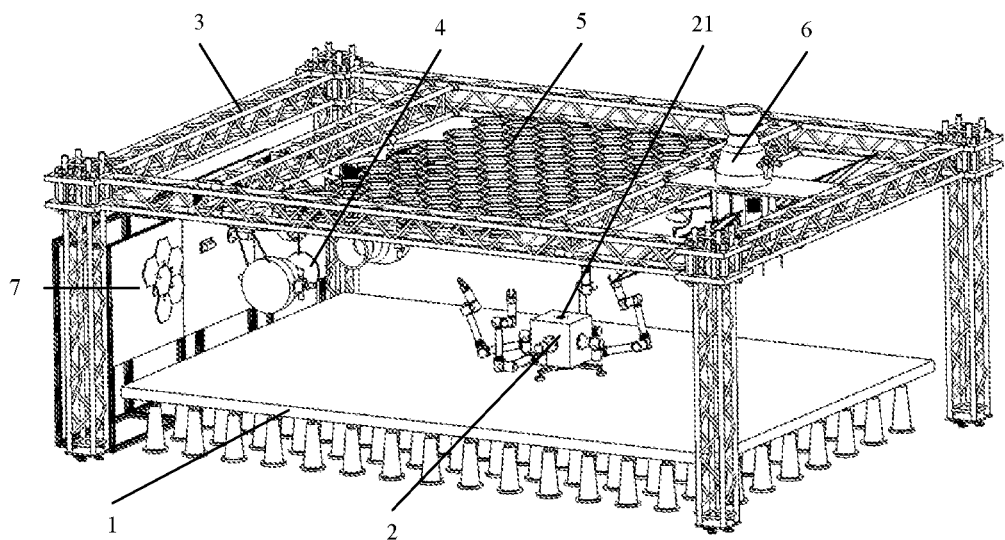
FIG. 1 is a schematic structural diagram of the present application.
Figure 2:
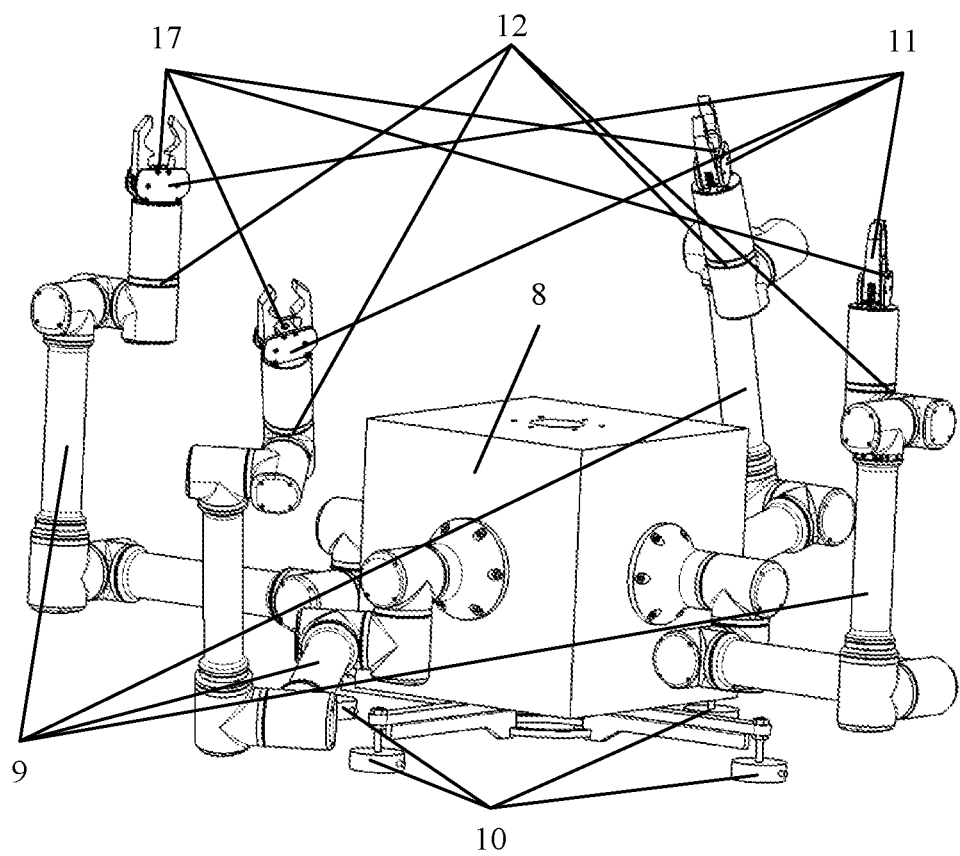
FIG. 2 is a schematic structural diagram of a spacecraft system simulator according to the present application.
Figure 3:
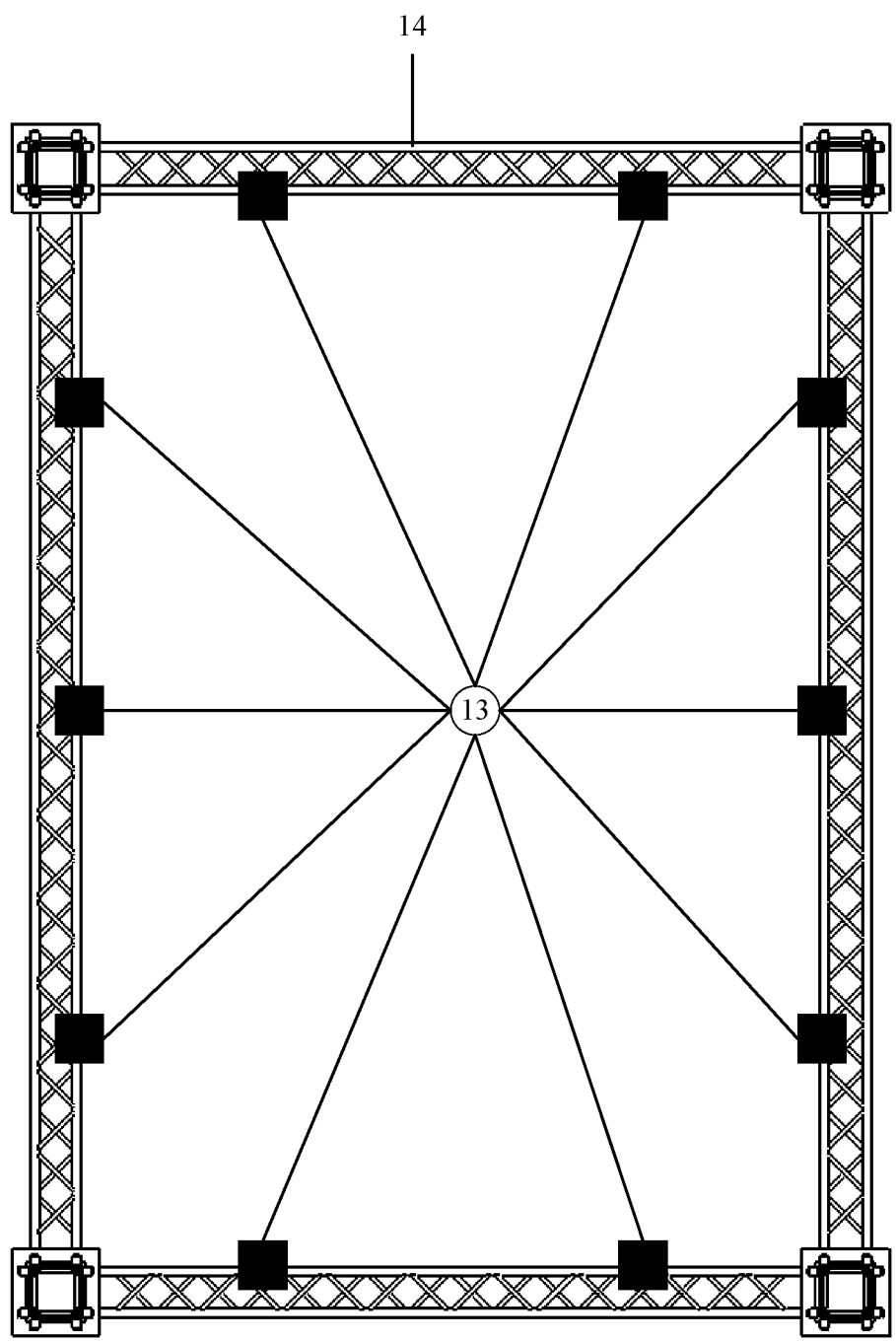
FIG. 3 is a schematic diagram of a positional relationship between a ceiling of the test truss and vision cameras according to the present application.
Figure 4:
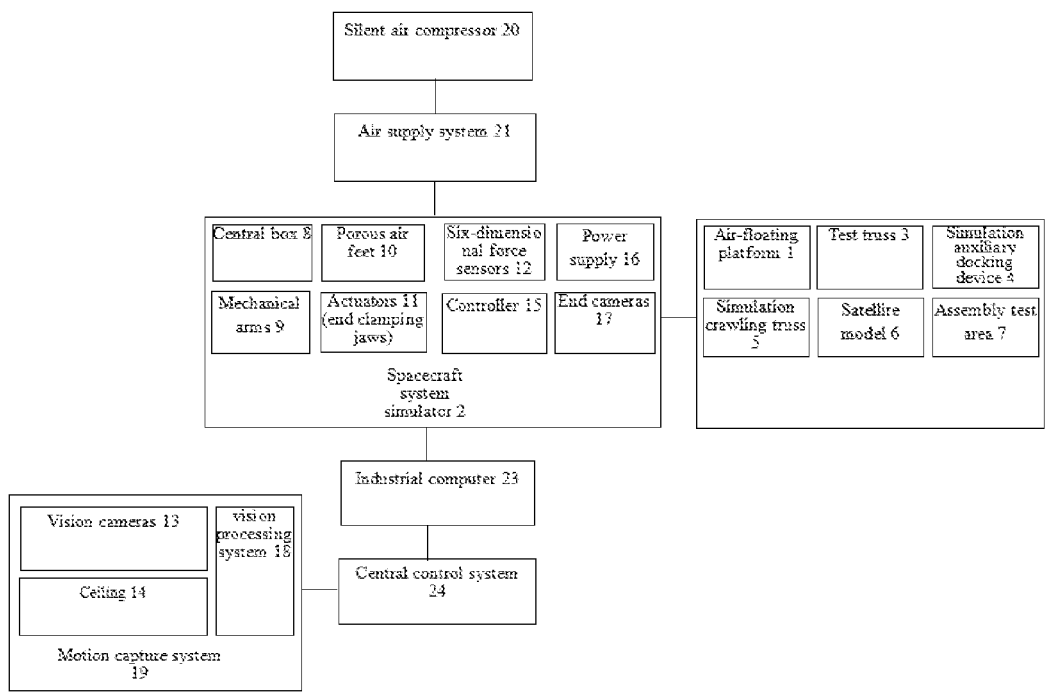
FIG. 4 is a schematic diagram of a controlling of a ground test system according to the present application.

The technical solutions in the embodiments of the present application will be clearly and completely described below with reference to the drawings in the embodiments of the present application. Obviously, the described embodiments are only part of the embodiments of the present application, but not all of them. Based on the embodiment of the present application, all other embodiments obtained by ordinary technicians in the field without creative labor are within the scope of the present application.

The application is realized by the following technical scheme.

A ground test system for a space-oriented multi-arm spacecraft system includes an air-floating platform 1, a spacecraft system simulator 2, a test truss 3, a simulation auxiliary docking device 4, a simulation crawling truss 5, a satellite model 6 and an assembly test area 7, where the air-floating platform 1 is placed on a plurality of supporting columns 25, the spacecraft system simulator 2 floats on the air-floating platform 1 through four porous air feet, the test truss 3 is placed around the air-floating platform 1, the test truss 3 is composed of four upright trusses and a truss ceiling, the simulation auxiliary docking device 4, the simulation crawling truss 5 and the satellite model 6 are arranged in a middle of a ceiling 14 of the test truss 3, and the assembly test area 7 and a silent air compressor 20 are arranged on sides of the test truss 3.

In the ground test system for space-oriented multi-arm spacecraft system, the spacecraft system simulator 2 includes a central box 8, mechanical arms 9, the porous air feet 10, actuators 11 and six-dimensional force sensors 12. A bottom of the spacecraft system simulator 2 is provided with the four porous air feet 10, the four porous air feet 10 are fixed on a bottom of the central box 8. Four mechanical arms 9 are installed on sides of the central box 8, and a tail end of each mechanical arm 9 is provided with one actuator 11 and one six-dimensional force sensor 12 respectively.

The actuators 11 are end clamping jaws.

The mechanical arms 9 are of seven degrees of freedom.

In the ground test system for a space-oriented multi-arm spacecraft system, a controller 15 and a power supply 16 are installed in the central box 8 of the spacecraft system simulator 2, and end cameras 17 are installed at tail ends of the mechanical arms 9.

In the ground test system for a space-oriented multi-arm spacecraft system, an array of a plurality of vision cameras 13 are uniformly distributed on the ceiling 14 of the test truss 3, and the array of vision cameras 13 are used for motion capture.

In the ground test system for a space-oriented multi-arm spacecraft system, the air floating platform 1 is used for simulating space microgravity environment and counteracting vertical gravity, so the spacecraft system simulator 2 "floats" on the air-floating platform 1;

the spacecraft system simulator 2 is used to simulate a movement and a crawling of the multi-arm spacecraft system in space, an assembly of large-scale space structures, and influences of the assembly and catching actions on a base, and to verify a planning or a control algorithm of a spacecraft system on-orbit control;

the ceiling 14 of the test truss 3 is used for installing a honeycomb structure simulating the movement, crawling and installation of a spacecraft, suspending a space target for auxiliary docking, and fixing a satellite model target in on-orbit operation, and the array of vision cameras 13 installed around the ceiling 14 of the test truss 3 is used for motion capture, and the sides of the test truss 3 are used for fixing space structures simulating on-orbit assembly;

the simulation auxiliary docking device 4 is used to simulate a docking process of the multi-arm spacecraft assisting the space target;

the simulation crawling truss 5 is used to simulate a process where the multi-arm spacecraft system moves, crawls and is assembled on the simulation crawling truss 5;

the satellite model 6 is used for simulating an on-orbit operation processes such as satellite maintenance, fuel filling, module replacement, solar panel auxiliary deployment, etc.;

the assembly test area 7 is used for simulating an on-orbit assembly process of the space structures, such as assembly, splicing, screwing and structure replacement;

the central box 8 is used for fixing a plurality of mechanical arms of the multi-arm spacecraft system and air feet at the bottom of the central box 8;

the mechanical arms 9 are used for realizing on-orbit operation actions of the spacecraft system and verifying the planning algorithm and control algorithm of the on-orbit operation actions of the spacecraft system;

the porous air feet 10 are used for counteracting gravity;

the actuators 11 are used for performing specific operation tasks, such as fixing crawling positions, screwing, clamping parts, drilling, etc.;

the six-dimensional force sensors 12 are used for measuring forces and moments of the mechanical arms in an operation process;

the supporting columns 25 are used for supporting the air-floating platform made of marble and adjusting a level of the air-floating platform.

A ground test system for a space-oriented multi-arm spacecraft system includes a central control system 24, an industrial computer 23, an on-orbit control simulation target 22, an air supply system 21, the silent air compressor 20, a motion capture system 19, a vision processing system 18, end cameras 17, the controller 15 and the power supply 16. The central control system 24 is connected with the motion capture system 19 and the industrial computer 23 respectively, the industrial computer 23 is connected with the controller 15 in the spacecraft system simulator 2, and the spacecraft system simulator is connected with the on-orbit control simulation target 22, the air supply system 21 and the silent air compressor 20 respectively.

The controller 15 is used to control the central box 8, the mechanical arms 9, the porous air feet 10, the actuators 11, the six-dimensional force sensors 12, the end cameras 17, the controller 15 and the power supply 16.

The on-orbit control simulation target 22 is used for controlling the air-floating platform 1, the test truss 3, the simulation auxiliary docking device 4, the simulation crawling truss 5, the satellite model 6 and the assembly test area 7.

The motion capture system 19 includes the vision processing system 18 and the array of vision cameras 13, where the vision processing system 18 is used to process information collected by the array of vision cameras and solve real-time position information and a motion state of the spacecraft system.

In the ground test system for a space-oriented multi-arm spacecraft system, the central control system 24 communicates with the controller 15 through the industrial computer 23, the central control system 24 send instructions to the controller 15 to control mechanical arms 9 to move according to the instructions through the industrial computer 23, and joint module encoders, the end cameras 17 and the six-dimensional force sensors 12 on the mechanical arms 9 return position, speed and torque information of each joint module of the mechanical arms and six-dimensional force and position information on tail ends to the central control system 24 through the industrial computer 23.

The array of vision cameras 13 feeds back motion information of the spacecraft system simulator 2 to the central control system 24 through the vision processing system 18.

The central control system 24 integrate the information returned by the spacecraft system simulator and the motion information from the motion capture system 19 to control kinematics and dynamics of the spacecraft system simulator.

In the ground test system for a space-oriented multi-arm spacecraft system, the controller 15 is used for controlling the spacecraft system simulator.

The power supply 16 is used for supplying power to the spacecraft system simulator.

The end cameras 17 are used for target identification.

The vision processing system 18 is used to process the information of the array of vision cameras and solve position information and a motion state of the spacecraft system simulator.

The motion capture system 19 is used to capture a position and the motion state of the spacecraft system simulator.

The silent air compressor 20 is used for providing an air source with a preset air pressure.

The air supply system 21 is used for distributing air paths and supplying air to the air feet.

The on-orbit control simulation target 22 is used for a simulation of on-orbit control.

The industrial control computer 23 is used for establishing a communication interface between a central control unit and the spacecraft system simulator and an ethercat (abbreviation of ethernet for control automation technology) master station equipped with a Linux real-time operating system and ethercat master station programs.

The central control system 24 is integrated with a task planning program, motion planning algorithm, kinematics and dynamics solving algorithm for the spacecraft system simulator, control algorithm for mechanical arms, etc., completes the motion planning according to task requirements, comprehensively processes the information of sensors and the motion capture system, gives output signals of the spacecraft system simulator by combining kinematics and dynamics solving, and controls the spacecraft simulator to perform corresponding actions.

Figure 5:
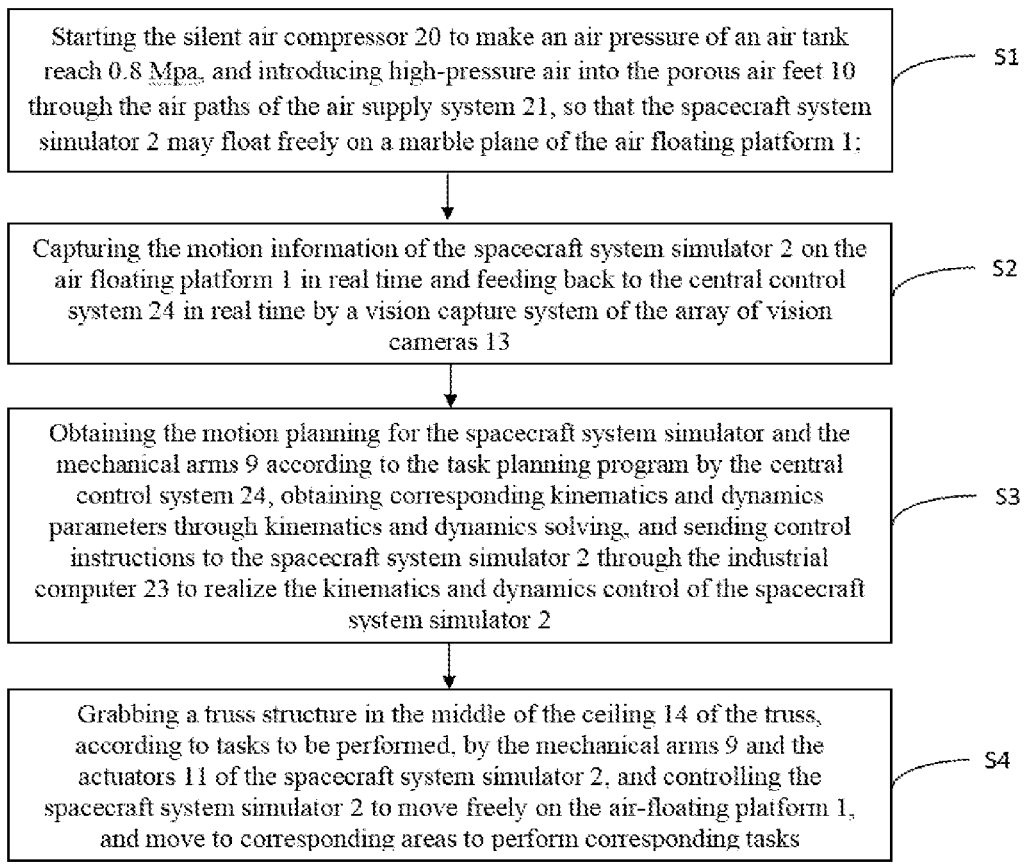
FIG. 5 is a flow chart of a ground test method for the ground test system for a space-oriented multi-arm spacecraft system.

As shown in FIG. 5, a ground test method for a space-oriented multi-arm spacecraft system is provided and the ground test method is specifically:

S1, starting the silent air compressor 20 to make an air pressure of an air tank reach 0.8 Mpa, and introducing high-pressure air into the porous air feet 10 through the air paths of the air supply system 21, so that the spacecraft system simulator 2 may float freely on a marble plane of the air floating platform 1;

S2, capturing the motion information of the spacecraft system simulator 2 on the air floating platform 1 in real time and feeding back to the central control system 24 in real time by a vision capture system of the array of vision cameras 13;

S3, obtaining the motion planning for the spacecraft system simulator and the mechanical arms 9 according to the task planning program by the central control system 24, obtaining corresponding kinematics and dynamics parameters through kinematics and dynamics solving, and sending control instructions to the spacecraft system simulator 2 through the industrial computer 23 to realize the kinematics and dynamics control of the spacecraft system simulator 2; and S4, grabbing a truss structure in the middle of the ceiling 14 of the truss, according to tasks to be performed, by the mechanical arms 9 and the actuators 11 of the spacecraft system simulator 2, and controlling the spacecraft system simulator 2 to move freely on the air-floating platform 1, and move to corresponding areas to perform corresponding tasks.

In the ground test method for a space-oriented multi-arm spacecraft system, different tasks are specifically performed as follows:

when a crawling task is performed, the crawling task is completed in an area of the simulation crawling truss 5 in the middle of the ceiling 14 of the test truss 3, and a moving task of the spacecraft on surfaces of large space structures is simulated;

when a simulation space auxiliary docking task is performed, the spacecraft system simulator 2 crawls to an area of the simulation auxiliary docking device 4 to realize the auxiliary docking of two spacecrafts through target identification and grabbing;

when a satellite maintenance task is performed, the spacecraft system simulator 2 crawls to an area of satellite model 6 to realize a simulation of satellite maintenance task, such as module replacement and fuel filling of satellite model 6;

when a space assembly task is performed, the spacecraft system simulator 2 moves to the assembly test area 7 by crawling to realize an independent assembly of the space structures in the assembly test area 7, including identifying and grabbing parts, identifying and aligning mounting holes, and clamping and fastening screws, where two mechanical arms 9 of the spacecraft system simulator 2 fix positions and postures, and the other two mechanical arms 9 cooperative control.

The existing ground simulation system of space robot is mainly used to verify the capture, motion planning and target tracking of a single mechanical arm, and often uses joint air feet support and suspension to counteract the gravity. For example, the space station mechanical arm in China is equipped with supporting air feet at three joints to counteract the gravity of the mechanical arm. At present, for complex space tasks, single arm is difficult to meet the requirements, and multi-arm cooperative operation is the main direction to complete more complex and delicate operations. However, a scheme of air feet support for joints similar to the space station mechanical arm has no degree of freedom in the vertical direction, which limits the simulation of dedicate operation. The existing dual-arm cooperative robot simulation system is mainly used to simulate on-orbit assembly, cooperative capture, etc., but it is mainly fixed on the ground or table, and the base is fixed, which limits the working space and cannot simulate the relative movement with the target. The existing ground test scheme adopts two large industrial mechanical arms to lift the space robot and the target in the air, which solves the simulation of relative motion. However, it can't simulate the movement, and crawling of the multi-arm spacecraft system in space, and assembly of large-scale space structures and the influence of assembly and capture on the base in weightless environment.

According to the application, weightlessness is simulated based on the air flotation technology; the test truss structure and satellite model simulating on-orbit control are installed above and around the air flotation platform; and the simulator completes tests such as on-orbit assembly, fuel filling, truss structure crawling, target identification and grabbing, auxiliary docking, etc.; a plurality of vision cameras are installed on the truss structure, which realizes the positioning and motion capture of the simulator, and assists the control and planning of the simulator.

The invention claimed is:

1. A ground test system for a space-oriented multi-arm spacecraft system, comprising an air-floating platform, a spacecraft system simulator, a test truss, a simulation auxiliary docking device, a simulation crawling truss, a satellite model and an assembly test area, wherein the air-floating platform is placed on a plurality of supporting columns, and the spacecraft system simulator comprises a central box, mechanical arms, actuators and six-dimensional force sensors; four porous air feet are fixed on a bottom of the central box, four mechanical arms are installed on sides of the central box, and a tail end of each mechanical arm is provided with one actuator and one six-dimensional force sensor respectively; the spacecraft system simulator floats on the air-floating platform through four porous air feet, the test truss is placed around the air-floating platform, the simulation auxiliary docking device, the simulation crawling truss and the satellite model are arranged in a middle of a ceiling of the test truss, and the assembly test area and a silent air compressor are arranged on sides of the test truss.

2. The ground test system for a space-oriented multi-arm spacecraft system according to claim 1, wherein a controller and a power supply are installed in the central box of the spacecraft system simulator, and end cameras are installed at tail ends of the mechanical arms.

3. The ground test system for a space-oriented multi-arm spacecraft system according to claim 1, wherein an array of a plurality of vision cameras are uniformly distributed on the ceiling of the test truss, and the array of vision cameras are used for motion capture.

4. The ground test system for a space-oriented multi-arm spacecraft system according to claim 1, wherein the air floating platform is used for simulating space microgravity environment and counteracting vertical gravity;

the spacecraft system simulator is used to simulate movement and crawling of the multi-arm spacecraft system in space, an assembly of large-scale space structures, and influences of the assembly and catching actions on a base, and to verify a planning algorithm or a control algorithm of a spacecraft system on-orbit control;

the ceiling of the test truss is used for installing a honeycomb structure simulating the movement, crawling and installation of a spacecraft, suspending a space target for auxiliary docking, and fixing a satellite model target in on-orbit operation, and the array of vision cameras installed around the ceiling of the test truss is used for motion capture, and the sides of the test truss are used for fixing space structures simulating on-orbit assembly;

the simulation auxiliary docking device is used to simulate a docking process of the multi-arm spacecraft system assisting the space target;

the simulation crawling truss is used to simulate a process wherein the multi-arm spacecraft system moves, crawls and is assembled on the simulation crawling truss;

the satellite model is used for simulating an on-orbit operation processes of satellite maintenance, fuel filling, module replacement, solar panel auxiliary deployment;

the assembly test area is used for simulating an on-orbit assembly process of the space structures;

the central box is used for fixing a plurality of mechanical arms of the multi-arm spacecraft system and is supported by air feet at the bottom of the central box;

the mechanical arms are used for realizing on-orbit operation actions of the spacecraft system and verifying the planning algorithm and the control algorithm of the on-orbit operation actions of the spacecraft system;

the porous air feet are used for counteracting gravity;

the actuators are used for performing specific operation tasks;

the six-dimensional force sensors are used for measuring forces and moments of the mechanical arms in an operation process;

the supporting columns are used for supporting the air-floating platform and adjusting a level of the air-floating platform.

5. The ground test system for a space-oriented multi-arm spacecraft system according to claim 1, wherein the ground test system comprises a central control system, an industrial computer, an on-orbit control simulation target, an air supply system, the silent air compressor, a motion capture system, a vision processing system, the end cameras, the controller and the power supply, wherein the central control system is connected with the motion capture system and the industrial computer respectively, the industrial computer is connected with a spacecraft simulation system in the spacecraft system simulator, and the spacecraft simulation system in the spacecraft system simulator is connected with the on-orbit control simulation target, the air supply system and the silent air compressor;

the spacecraft simulation system is used to control the central box, the mechanical arms, the porous air feet, the actuators, the six-dimensional force sensors, the end cameras, the controller and the power supply;

the on-orbit control simulation target is used for controlling the air-floating platform, the test truss, the simulation auxiliary docking device, the simulation crawling truss, the satellite model and the assembly test area;

the motion capture system comprises the vision processing system and the array of vision cameras, wherein the vision processing system is used to process information collected by the array of vision cameras and solve real-time position information and a motion state of the spacecraft system.

6. The ground test system for a space-oriented multi-arm spacecraft system according to claim 5, wherein the central control system controls the spacecraft simulation system through the industrial computer, the central control system and the industrial computer control the mechanical arms to move according to instructions, and joint module encoders, the end cameras and the six-dimensional force sensors on the mechanical arms return position, speed and torque information of each joint module of the mechanical arms and six-dimensional force and position information on tail ends to the central control system through the industrial computer;

the array of vision cameras feeds back motion information of the spacecraft system simulator to the central control system through the vision processing system;

the central control system integrates the information returned by the spacecraft simulation system and the motion information from the motion capture system to control kinematics and dynamics of the spacecraft simulation system.

7. The ground test system for a space-oriented multi-arm spacecraft system according to claim 6, wherein the controller is used for controlling the spacecraft system simulator;

the power supply is used for supplying power to the spacecraft system simulator;

the end cameras are used for target identification;

the vision processing system is used to process the information of the array of vision cameras and solve position information and a motion state of the spacecraft system simulator;

the motion capture system is used to capture a position and the motion state of the spacecraft system simulator;

the silent air compressor is used for providing an air source with a preset air pressure;

the air supply system is used for distributing air paths and supplying air to the air feet;

the on-orbit control simulation target is used for a simulation of on-orbit control;

the industrial control computer is used for establishing a communication interface between a central control unit and the spacecraft system simulator and an ethercat master station equipped with a Linux real-time operating system and ethercat master station programs;

the central control system is integrated with a task planning program, motion planning algorithm, kinematics and dynamics solving algorithm for the spacecraft simulation system, control algorithm for mechanical arms, completes the motion planning according to task requirements, comprehensively processes the information of sensors and the motion capture system, gives output signals of the spacecraft system simulator by combining kinematics and dynamics solving, and controls the spacecraft simulator to perform corresponding actions.

8. A ground test method for the ground test system for a space-oriented multi-arm spacecraft system according to claim 5, comprising:

starting the silent air compressor to make an air pressure of an air tank reach 0.8 Mpa, and introducing high-pressure air into porous air feet through air paths of an air supply system, so that a spacecraft system simulator floats freely on a marble plane of an air floating platform;

capturing motion information of the spacecraft system simulator on the air floating platform in real time and feeding back to a central control system in real time by a vision capture system of the array of vision cameras;

obtaining a motion planning for the spacecraft simulation system and mechanical arms according to a task planning program by the central control system, obtaining corresponding kinematics and dynamics parameters through kinematics and dynamics solving, and sending control instructions to the spacecraft system simulator through an industrial computer to realize kinematics and dynamics control of the spacecraft system simulator; and grabbing a truss structure in the middle of the ceiling of the test truss, according to tasks to be performed, by the mechanical arms and actuators of the spacecraft simulation system, and controlling the spacecraft system simulator to move freely on the air-floating platform, and move to corresponding areas to perform corresponding tasks.

9. The ground test method for the ground test system for a space-oriented multi-arm spacecraft system according to claim 8, wherein different tasks are specifically performed as follows: a crawling task is performed in an area of the simulation crawling truss in the middle of the ceiling of the test truss, and a moving task of a spacecraft on surfaces of large space structures is simulated;

a simulation space auxiliary docking task is performed by crawling to an area of the simulation auxiliary docking device to realize the auxiliary docking of two spacecrafts through target identification and grabbing;

a satellite maintenance task is performed by crawling to an area of satellite model to realize a simulation of satellite maintenance task of module replacement and fuel filling of satellite model; and a space assembly task is performed by crawling to the assembly test area to realize an independent assembly of the space structures in the assembly test area, including identifying and grabbing parts, identifying and aligning mounting holes, and clamping and fastening screws, wherein two mechanical arms of the spacecraft system simulator fix positions and postures, and the other two mechanical arms cooperative control.

\* \* \* \* \*